---

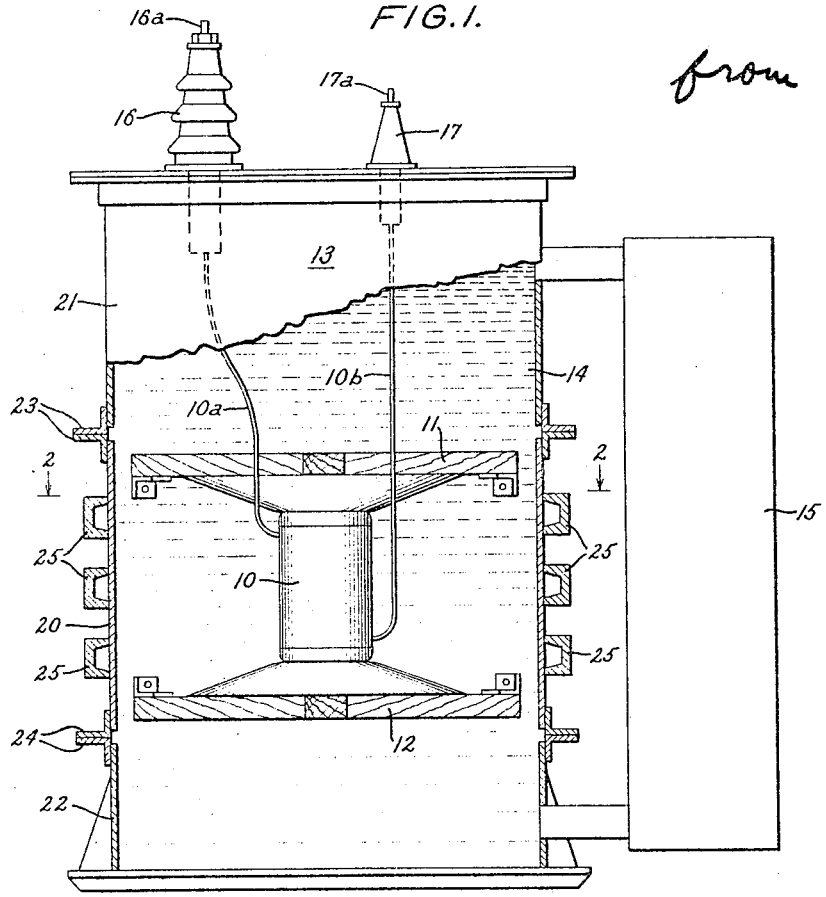
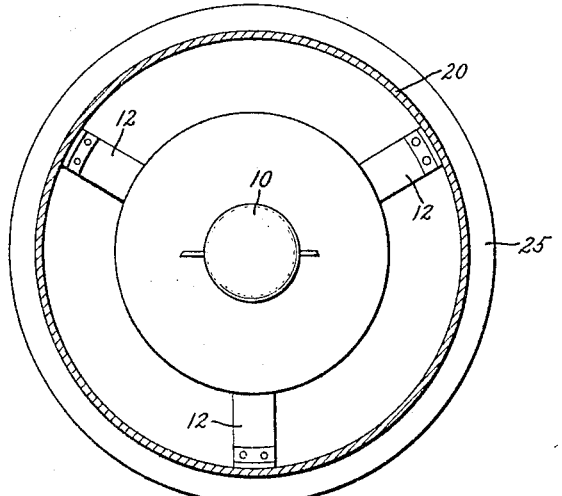
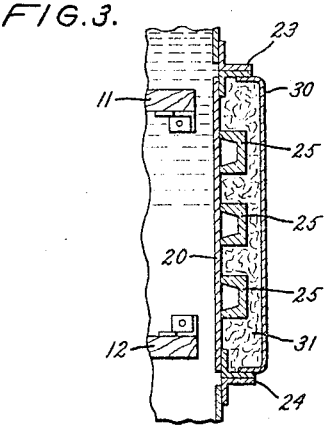
FIG.1.
FIG.2.  FIG.3.
INVENTOR:
ANDREW GLASSANOS,
ATTORNEY

United States Patent Office 3,270,305
Patented August 30, 1966

3,270,305
SHIELDED HOUSING WITH VIBRATION CONTROL
Andrew Glassanos, Pittsfield, Mass., assignor to General Electric Company, a corporation of New York
Filed Mar. 18, 1965, Ser. No. 440,799
6 Claims. (Cl. 336—84)

My invention relates to electric induction apparatus, and more particularly to means for reducing the audible noise generated during normal operation of such apparatus. The invention is particularly applicable to large coreless reactors used for current limitation or power factor correction in alternating current power transmission and distribution system.

Large electrical induction apparatus such as power transformers, reactors and the like, inherently produce audible frequency vibrations during normal operation. When such apparatus is housed in a metallic housing or tank, the vibrations transmitted to the housing are in turn transmitted to the surrounding atmosphere as audible noise. Such noise is frequently the source of complaint when the apparatus is positioned in locations having otherwise relatively low noise level.

Two basic approaches for reducing the amount of noise transmitted by such apparatus are: first, to improve the construction of the apparatus so that the amount of vibration generated is decreased; and second, to interpose barriers or vibration dampening means between the apparatus and the atmosphere surrounding it. Numerous expedients have been proposed by the prior art in accordance with the above approaches. These include reducing vibrations by operating the apparatus at relatively low flux density levels in order to decrease magnetostrictive effects in magnetic core materials; and damping vibrations by supporting the apparatus on resilient mountings and interposing various types of vibration-absorbing barriers between vibrating members and the housing. In general, the arrangements proposed by the prior art are relatively expensive, and there are some apparatus arrangements for which no satisfactory solution has been devised.

More specifically the problem of noise suppression is particularly acute in large coreless reactors. These devices are employed in alternating current electrical power generation and distribution systems for limiting current during surges or for balancing the capacitance of the power distribution line. Reactors are often several feet in height and diameter, and are operated at high energy or power levels. Consequently they have large metal surfaces which are driven into vibration by the power flowing through them thereby to produce audible noise of disturbing quantity. Accordingly I have chosen an embodiment of this type of apparatus for illustrating and explaining my invention. It will be understood however that the principles of my invention may be employed with other types of electrical apparatus.

Coreless power reactors are an extreme example of electrical induction apparatus in which the flux tends to fringe outwardly to such an extent that it causes larger eddy current loses and dangerous heating in the magnetic material of the enclosing tanks or housings employed to contain the apparatus. Consequently flux-confining eddy current shields have been employed to severely restrict the amount of flux permitted to reach the magntizable material of the tank walls. Such shields are commonly made from highly conductive materials such as copper and aluminum, and are ordinarily formed as cylinders disposed within the tank between the coil and the tank walls. Low resistance electrically conducting materials such as copper and aluminum, however, are relatively soft and flexible, and shields of such size are difficult to form in an exactly circular or cylindrical configuration. The interaction of the magnetic field with the eddy currents in the shield produces varying amounts of stress throughout the shield, and these stresses cause the shield to expand and contract at various locations thus producing a large amount of vibration. Such vibration is severely aggravated by even slight deviations of the shield cross-section from a perfect circle. Assuming that the eccentricity of the shield causes it to approach an elliptical shape, it can be shown mathematically that a one-half inch thick shield having a fifty inch radius which is 0.2" out of round will vibrate with an intensity 72 times as great as would occur with the same shield if truly circular.

It is evident therefore that in coreless reactors a very high proportion of the noise generated by the apparatus is caused by the vibration of the eddy current shield. It has therefore been the practice to provide between the eddy current shield and the tank wall a vibration barrier in the form of an evacuated space or a layer of gas or other vibration damping material. This, of course, adds considerably to the cost of the apparatus and is desirably to be eliminated is possible.

Accordingly it is an object of my invention to provide an improved eddy current shield so constructed that in similar magnetic fields its intensity of vibration is considerably less than that of prior art shields.

It is another object of my invention to so construct and locate an eddy current shield that it is unnecessary to provide a vibration barrier between the shield and tank wall.

It is a more particular object of my invention to provide an improved housing or tank for electric induction apparatus, and particularly for large coreless power reactors in which an eddy current shield of improved rigid construction is incorporated as an integral part of the tank wall.

In carrying out my invention in one preferred embodiment, I provide an electric induction apparatus, such as a coreless power reactor coil, mounted centrally within a cylindrical oil-filled tank which includes a central or intermediate wall section formed of heavy gauge copper or aluminum. This central tank section of low resistance electric conducting material is interposed between a pair of closed cylindrical and sections or caps, and thus serve as an eddy current shield integral with the tank structure. The juxtaposed tank sections are connected together by means of circumferential flanges which greatly increase the rigidity of the central shielding section. The end sections may be formed of welded sheet steel or steel plate as is customary in the construction of transformer or reactor tanks. Intermediate to its flanged ends the central tank section is additionally braced by plurality of circumferential bands which are preferably formed of rigid channel sections rolled into hoops of accurate circular configuration. The reactor coil is mounted within the tank and substantially centrally located within the cylindrical central shielding section.

By construction of my improved eddy current shield as an integral part of the tank or housing wall, it acquires such rigidity as part of this structure that vibration is greatly diminished by comparison with the unbraced internal eddy current shields previously known. By this construction vibration barriers between the eddy current shield and the tank wall are eliminated and rendered unnecessary. It is of course possible to further diminish the sound level of my apparatus by packing sound-absorbing material about the outer surface of my conducting tank wall section or by otherwise building an acoustical barrier about the outer surfaces of the shield. For example the shielding tank section may be a double walled section with the space between the walls evacuated or otherwise acoustically baffled.

My invention will be more fully understood and its various objects and advantages further appreciated by referring now to the following detailed specification taken in conjunction with the accompanying drawing in which:

FIG. 1 is a side elevational view, partly in cross-section, of a coreless electric power power reactor embodying my invention;

FIG. 2 is a cross-sectional view taken along the line 2—2 of FIG. 1; and

FIG. 3 is a fragmentary axial cross-sectional view of a reactor tank having a central wall section embodying my invention in modified form.

Referring now to FIGS. 1 and 2, I have illustrated a coreless electric power reactor comprising an electric coil 10 mounted between a pair of spaced-apart supporting insulating spiders 11 and 12 and within a cylinder tank or housing 13. The housing 13 is substantially filled with a suitable insulating fluid 14 such as oil or askarel, the coil 10 and its supporting structure being completely immersed in the fluid. The insulating fluid 14 is arranged to be circulated through a cooling radiator 15 in any well-known manner. The coil 10 is provided with leads 10a and 10b passing through the top of the tank in insulating bushings 16 and 17 to suitable high and low voltage external terminals 16a and 17a, respectively.

The cylindrical tank 13 is made up of three axially aligned and juxtaposed sections, the intermediate or central one of which is formed of suitable low resistance electric conducting material such as copper or aluminum. At FIG. 1 a cylindrical central section 20, formed for example of aluminum, is interposed between a pair of closed end sections or caps 21 and 22 made of steel plate to provide top and bottom tank closures. The three tank sections are interconnected at opposite ends of the intermediate conducting section 20 by means of cooperating pairs of circumferential flanges 23 and 24 on the several tank sections. Thus a circumferential flange 23, 24 is provided at each of the axially opposite ends of the aluminum central section 20, and these flanges serve both to connect to cooperating flanges on the end sections and also to add strength and rigidity to the otherwise flexible central section of aluminum.

To add further rigidity to the electrically conducting central shielding section 20, I have found it desirable to add additional circumferential bracing between the end flanges 23 and 24. For this purpose I have shown at FIG. 1 a plurality of external circular bracing bands 25 encircling the tank section 20 and each formed of a channel-shaped aluminum beam rolled into a ring of accurate circular configuration. The bracing bands 25 serve to preclude undesired eccentricity in the cross-sectional configuration of the central section 20, and serve also to effectively restrain vibration of any objectionable large amplitude.

It will now be understood that, in operation, magnetic flux established by the coil 10, being unrestrained by any core of magnetizable material spreads out widely within the tank 13. Because of the electromagnetic shielding effect of the low resistance electric conducting tank section 20, the major portion of this flux is confined within the tank. In a power reactor of considerable size such as that described herein, the diameter of the tank section 20 may be of the order of several feet. It will be evident therefore that the reaction between the coil flux and the eddy currents set up in the shielding section 20 results in forces of considerable magnitude which exert stresses upon the section 20 and tend to set it into vibration. The tendency to vibrate is, of course, very greatly exaggerated by and any slight eccentricity or deviation of the section from a theoretically perfect circular cross-section. Due to the constraining and strengthening effect of the end flanges 23, 24 and the circumferential braces 25, however, the central section is of sufficiently rigid structure that the amplitude of vibration is considerably less than in unbraced interior shields previously known.

There is, of course, some minor degree of vibration set up in the shielding central section 20 of my improved reactor tank. Any vibration of this section, or for that matter of any portion of the tank, sets the surrounding air into vibration and thus causes noise which may be objectionable to a greater or lesser extent. In order to further minimize noise level the central section 20 may be encased in an acoustical barrier as shown at FIG. 3. As there illustrated, one such barrier comprises an outer wall or collar 30 of aluminum or other suitable metal material having approximately the same axial dimension as the conducting wall section 20 and connected between the circumferential flanges 23 and 24 on the section 20. The central wall section 20 and the external collar 30 thus form a double walled central tank section enclosing between its radially spaced-apart walls the circumferential braces 25. The space between the shielding wall section 20 and the spaced-apart outer wall 30, if evacuated or filled with a sound-absorbing material, acts as an acoustic barrier to further diminish the vibration to which the surrounding air is exposed. At FIG. 3 I have shown the space surrounding the shield 20 filled with a mat of fibrous sound-absorbing material 31 such as glass wool or the like.

While I have described a preferred embodiment of my invention by way of illustration, various modifications will occur to those skilled in the art. Accordingly, I intend in the appended claims to cover all such modifications as fall within the true spirit and scope of my invention.

What I claim as new and desire to secure by Letters Patent of the United States is:

1. An alternating current electric induction apparatus comprising a three-part tubular housing including closed end sections of magnetizable material and an intermediate section formed of non-magnetic low resistance electric conducting material, said sections including cooperating pairs of circumferential connecting flanges adjacent axially opposite ends of said intermediate section, said flanges acting to stiffen said intermediate section and restrain its vibration, and a current-carrying coil coaxially mounted in said housing between axially opposite ends of said intermediate section, said coil when energized establishing an alternating magnetic flux which is in major part confined within said housing by the electromagnetic shielding action of said intermediate housing section.

2. An electric induction apparatus according to claim 1 in which said housing sections are cylindrical and a plurality of rigid circular bracing bands are disposed circumferentially about the exterior of said low resistance intermediate section.

3. A coreless electric reactor comprising a closed cylindrical housing having end caps of magnetizable material and a central section formed of low resistance electric conducting material, said central section being provided at axially opposite ends thereof with circumferential connecting flanges and having intermediate its ends a plurality of rigid circumferential bracing bands of channel-shaped cross section, a current-carrying coil coaxially mounted within said housing substantially centrally within said central section, and a body of insulating liquid substantially filling said housing and immersing said coil.

4. A coreless electric reactor according to claim 3 in which said central section is of spaced double-wall construction with at least the inner wall thereof formed of low resistance electric conducting material, and means between the inner and outer walls of said central section providing an acoustical barrier to sound waves generated by vibration of said inner wall.

5. A coreless electric reactor according to claim 3 in which said braces are exterior to said central section and a radially spaced-apart outer wall is provided about said central section between said connecting flanges.

6. A coreless electric reactor according to claim 5 in which the circumferential space between said central section and said outer wall is filled with sound-absorbing material.

References Cited by the Examiner

UNITED STATES PATENTS

| | | | |
|---|---|---|---|
| 1,722,149 | 7/1929 | Kubler | 336—84 |
| 2,340,081 | 1/1944 | Sauber | 336—84 |
| 3,102,246 | 8/1963 | Honey et al. | 336—100 |

FOREIGN PATENTS 435,038   9/1935   Great Britain.

LARAMIE E. ASKIN, *Primary Examiner.*

T. J. KOZMA, *Assistant Examiner.*